(12) United States Patent
Liu (10) Patent No.: US 7,374,306 B2
(45) Date of Patent: May 20, 2008

(54) BACKLIGHT MODULE HAVING DEVICE FOR FASTENING LIGHTING UNITS

(75) Inventor: Pang-Hsuan Liu, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 138 days.

(21) Appl. No.: 11/182,210

(22) Filed: Jul. 15, 2005

(65) Prior Publication Data

US 2006/0187660 A1    Aug. 24, 2006

(30) Foreign Application Priority Data

Feb. 18, 2005   (TW)  .............................. 94104798 A (51) Int. Cl.
  *G01D 11/28*     (2006.01)
(52) U.S. Cl. .......................... 362/27; 362/97; 362/612; 362/613
(58) Field of Classification Search ................ 362/294, 362/249, 225, 612, 613, 27, 97
  See application file for complete search history.

(56) References Cited

U.S. PATENT DOCUMENTS

| | | | | |
|---|---|---|---|---|
| 4,234,914 | A  * | 11/1980 | Boesen | 362/240 |
| 5,722,767 | A  * | 3/1998 | Lin | 362/249 |
| 6,789,921 | B1 * | 9/2004 | Deloy et al. | 362/252 |
| 7,195,364 | B2 * | 3/2007 | Hahm et al. | 362/27 |
| 2005/0231949 | A1* | 10/2005 | Kim et al. | 362/249 |
| 2005/0248939 | A1* | 11/2005 | Li et al. | 362/225 |
| 2006/0092637 | A1* | 5/2006 | Yeh | 362/249 |

* cited by examiner

*Primary Examiner*—Sandra O'Shea
*Assistant Examiner*—James W Cranson
(74) *Attorney, Agent, or Firm*—Birch, Stewart, Kolasch & Birch, LLP (57) ABSTRACT

A device for fastening the lighting units in a backlight module is provided. A rigid board partially laps over the adjacent lighting unit or units. The rigid board and the backboard have holes respectively such that a bolt is passed through the holes and locked on a nut. Accordingly the rigid board exerts a compressing strength to fasten the adjacent lighting unit or units onto the backboard.

20 Claims, 11 Drawing Sheets

BACKLIGHT MODULE HAVING DEVICE FOR FASTENING LIGHTING UNITS

BACKGROUND OF THE INVENTION

1. Field of the Invention

The present invention relates to a fastening device, and more particularly relates to a fastening device utilized in a backlight module to fasten the lighting units.

2. Description of the Prior Art

Figure 1:
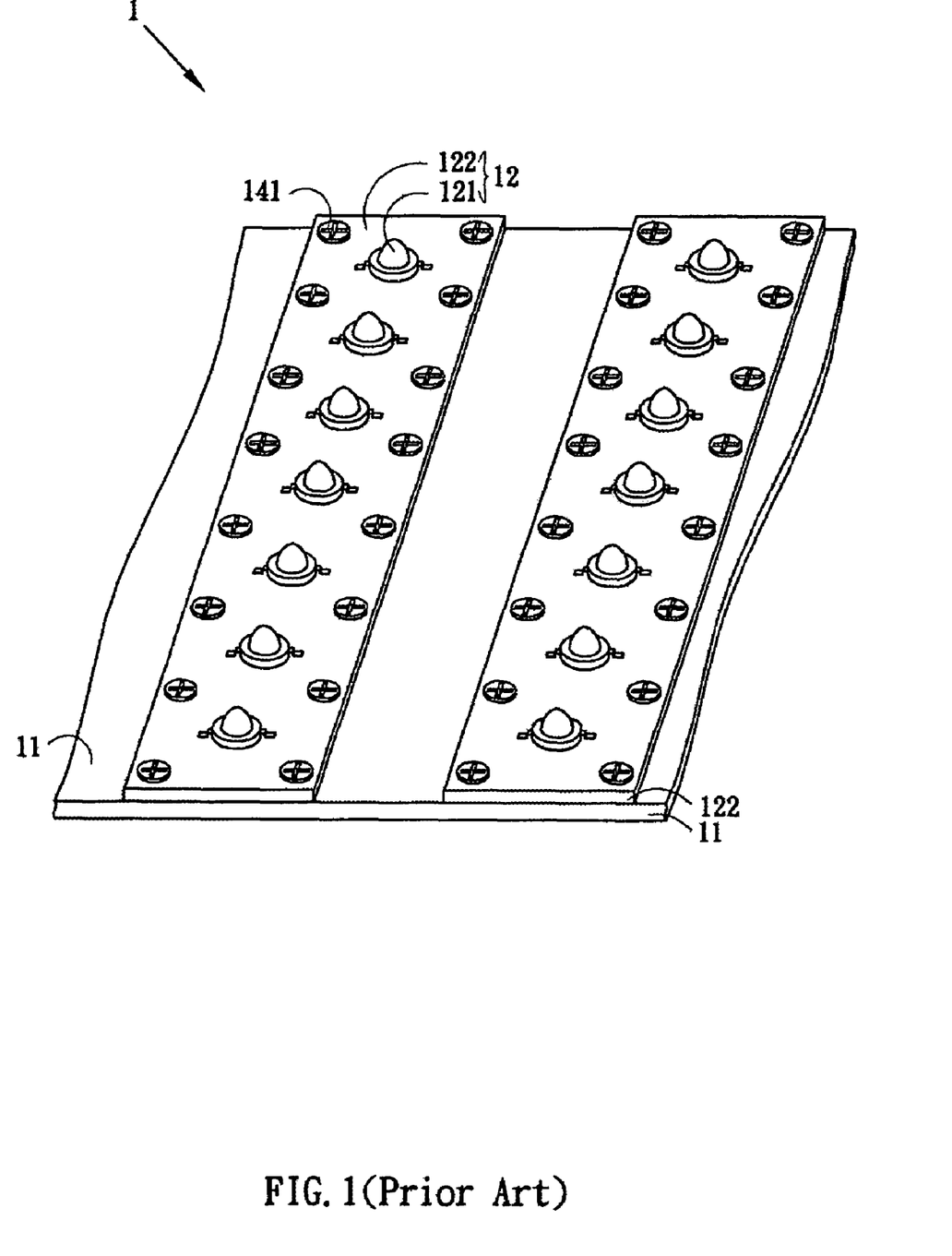
FIG. 1 is a perspective view illustrating the backlight module by using bolts and nuts to fasten the lighting units in the prior art.

Referring to FIG. 1, in the prior art, there is a fastening device used to fasten the lighting units 12 of the backlight module 1 within a liquid crystal display. The backlight module 1 composes a backboard 11 and a plurality of lighting units 12 arranged in equal space and in parallel on the backboard 11. Each of the lighting units 12 includes a plurality of lighting elements 121 and an aluminum board 122 carrying the lighting elements 121, wherein the lighting elements 121 are soldered above the aluminum board 122 and connected with the conductive trace (not shown). And, the heat generated by operating the lighting units 12 is dissipated to the backboard 11 through the aluminum board 122.

Still referring to FIG. 1, the conventional method of the prior art used to fasten the lighting unit 12 is to form the corresponding holes between the aluminum board 122 and the backboard 11, and then use bolts 141 to pass through the holes of the aluminum board 122 and the backboard 11. Thereafter, the bolts 141 are locked together with the nuts placed at the other side of the backboard 11 and the lighting units 12 are thus fastened to the backboard 11.

Since the material of the aluminum board 122 is not hard enough such that it is inevitable to have some voids between the aluminum board 122 and the backboard 11 to block the thermal dissipation. Therefore, in order to let the aluminum board 122 and the backboard 11 have the effect of sticking tightly, in the prior art, the solution is using lots of bolts 141 and nuts. However, it increases the complexity of the backlight module, the time of the assembling, and the cost of the producing during the fabricating.

SUMMARY OF THE INVENTION

According to the drawbacks described above, the conventional method of fastening the lighting units in the backlight module suffers complexity in assembling and high cost of manufacturing, and therefore, the purpose of the present invention is to provide a fastening device utilized in a backlight module to fasten the lighting units. An object of the present invention is to firmly fasten the lighting units unto the backboard of the backlight module so that the assembling is simplified and the required amount of the nuts and bolts is greatly reduced.

According to the object described above, the present invention discloses a fastening device utilized in a backlight module to fasten the lighting units and the resultant backlight module. A rigid board partially laps over the adjacent lighting unit or units. The rigid board and the backboard have holes respectively such that bolts are passed through the holes and locked on nuts. Accordingly the rigid board exerts a compressing strength to fasten the adjacent lighting unit or units onto the backboard. In addition to the simplification of the assembling and the decrease of the amount of the nuts and bolts required, the efficiency of thermal dissipation between the lighting units and the backboard is further improved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed, given hereinbelow and the accompanying drawings, which are given by way of illustration only, and thus are not limitative of the present invention, and wherein.

DESCRIPTION OF THE PREFERRED EMBODIMENT

The following is the detailed description of the present invention, which describes the backlight module and the lighting units, but the detailed structure composition and the operating theory are not discussed. The portions relating to the conventional techniques are briefly described, and the parts of the drawings are not proportionally drafted. While embodiments are discussed, it is not intended to limit the scope of the present invention. Except expressly restricting the amount of the components, it is appreciated that the quantity of the disclosed components may be greater than that disclosed.

One of the preferred embodiments of the present invention discloses a backlight module in which the lighting units are fastened. First referring to FIG. 2A, a backlight module 2 is composed of a backboard 21 and a plurality of lighting units 22 arranged in equal space and in parallel to one another on the backboard 21. Each lighting unit 22 comprises a plurality of lighting elements 221 and a metal board 222 carrying the lighting elements 221. The lighting element 221 can be a conventional lighting device such as a light emitting diode (LED) soldered on the metal board 222. On the metal board 222 is the conductive trace (not shown). The boards 222 in general can be metal boards, such as aluminum boards, or printed circuit boards (PCBs) having good thermal conductivity. Therefore, the heat generated from the lighting element 221 could be effectively dissipated to the backboard 21 through the metal boards/PCBs 222.

Figure 2A:
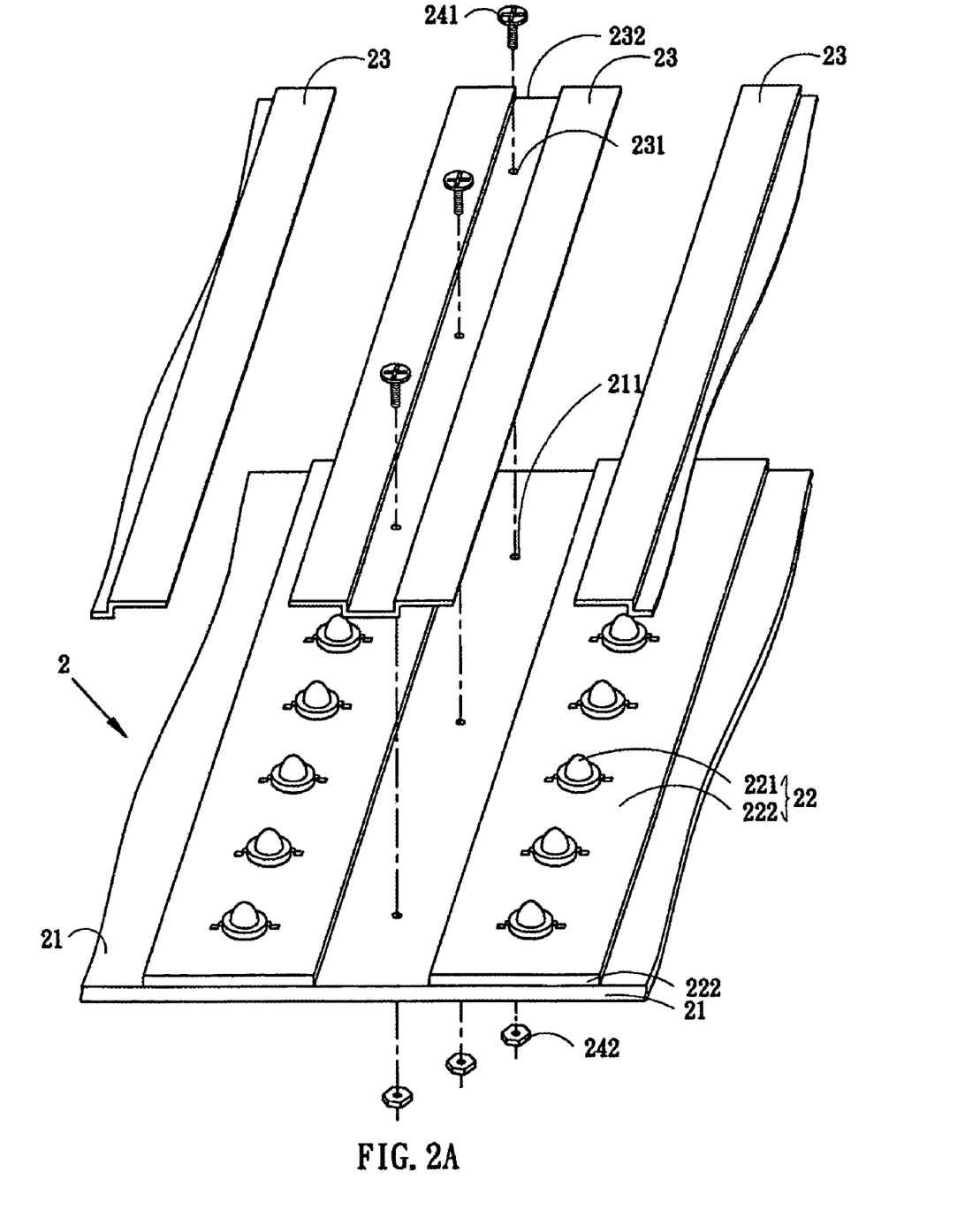
FIGS. 2A-2B are perspective views illustrating the lighting units within the backlight module fastened by the rigid metal board according to one embodiment of the present invention.

Still referring to FIG. 2A, in the embodiment of the present invention, the lighting units 22 are fastened by using a rigid metal board 23 and fasteners (241, 242), where holes 211 and 231 are correspondingly formed in the backboard 21 and the rigid metal board 23, respectively. The rigid metal board 23 can be a tinned steel board or a stainless steel board, and has a raised portion along its center to face towards the backboard 21. The opposite of the raised portion is a concave side 232 facing upwards, which is in a direction parallel with the metal board 222. Beside, the fasteners mentioned above can be bolts 241 and nuts 242.

Figure 2B:
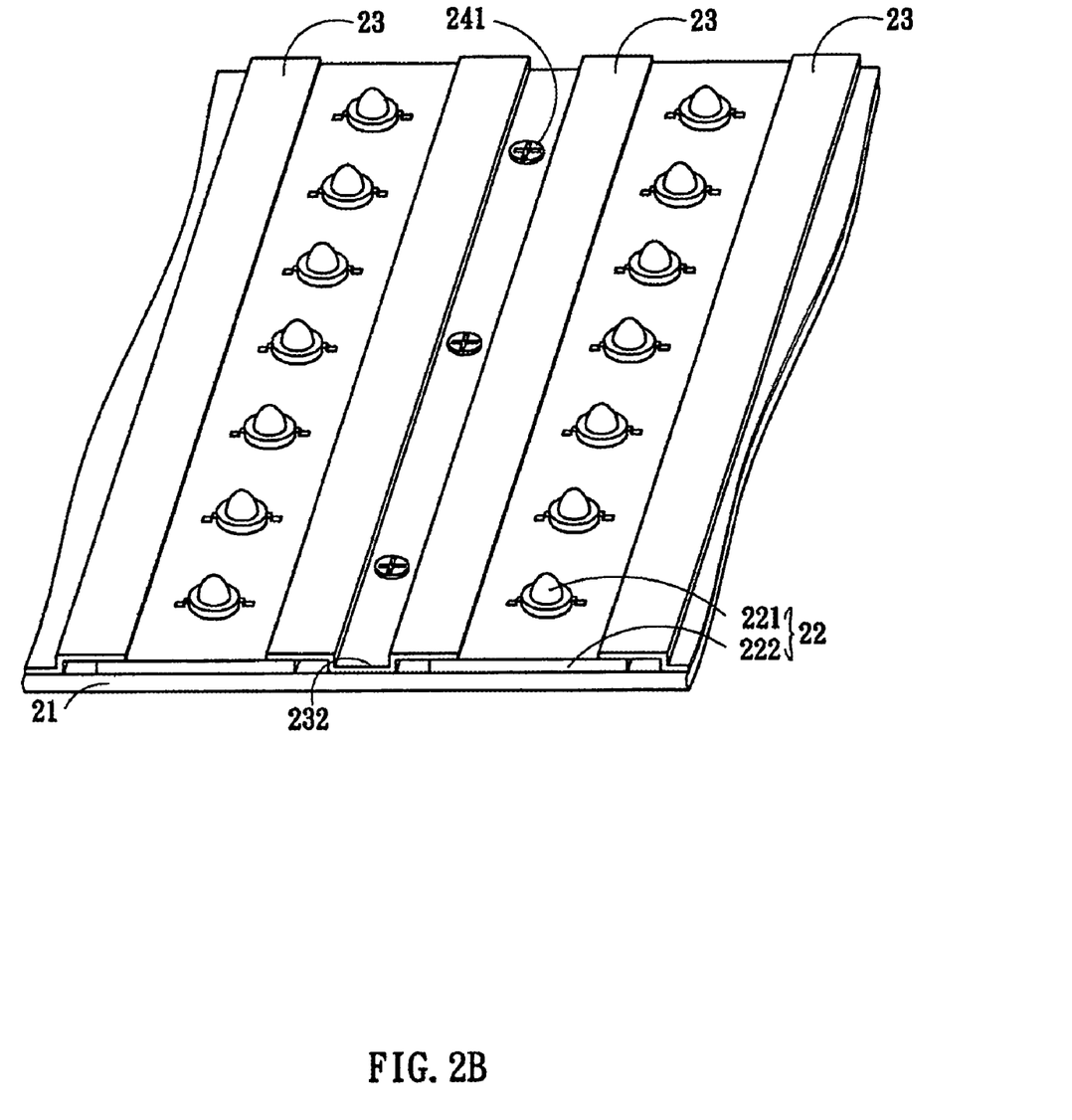

Now referring to FIG. 2B, when the rigid metal board 23 is moved and configured between two adjacent metal boards 222, the two sides of the rigid metal board 23 with good rigidity lap over the adjacent portions of the metal boards 222. And, when the bolts 241 are passed through the holes 231 of the concave portion 232 and the holes 211 of the backboard 21, and locked together with nuts 242 (not shown in the figure), the rigid metal board 23 can be fastened on the backboard 21. And, the strength of the compressing provided by the rigid metal board 23 can fasten the adjacent boards 222 on the backboard 21. In this embodiment, the bolts 241 are passed through the holes 211 and 231 and locked in the nuts 242. But based on other embodiments of the present invention, however, the holes 211 of the backboard 21 can be replaced by threaded holes, and the bolts replaced by screws. At the time, the screws are passed through the threaded holes and locked directly to the backboard 21. Accordingly, the lighting units 22 are thus fastened in the backlight module 2 and the heat generated during operating the lighting elements 221 can be dissipated from the metal board 222 to the rigid metal board 23, and ultimately to the backboard 21, thereby enhancing the efficiency of the thermal dissipation and also reducing the needed amount of bolts/screws and nuts.

Figure 2C:
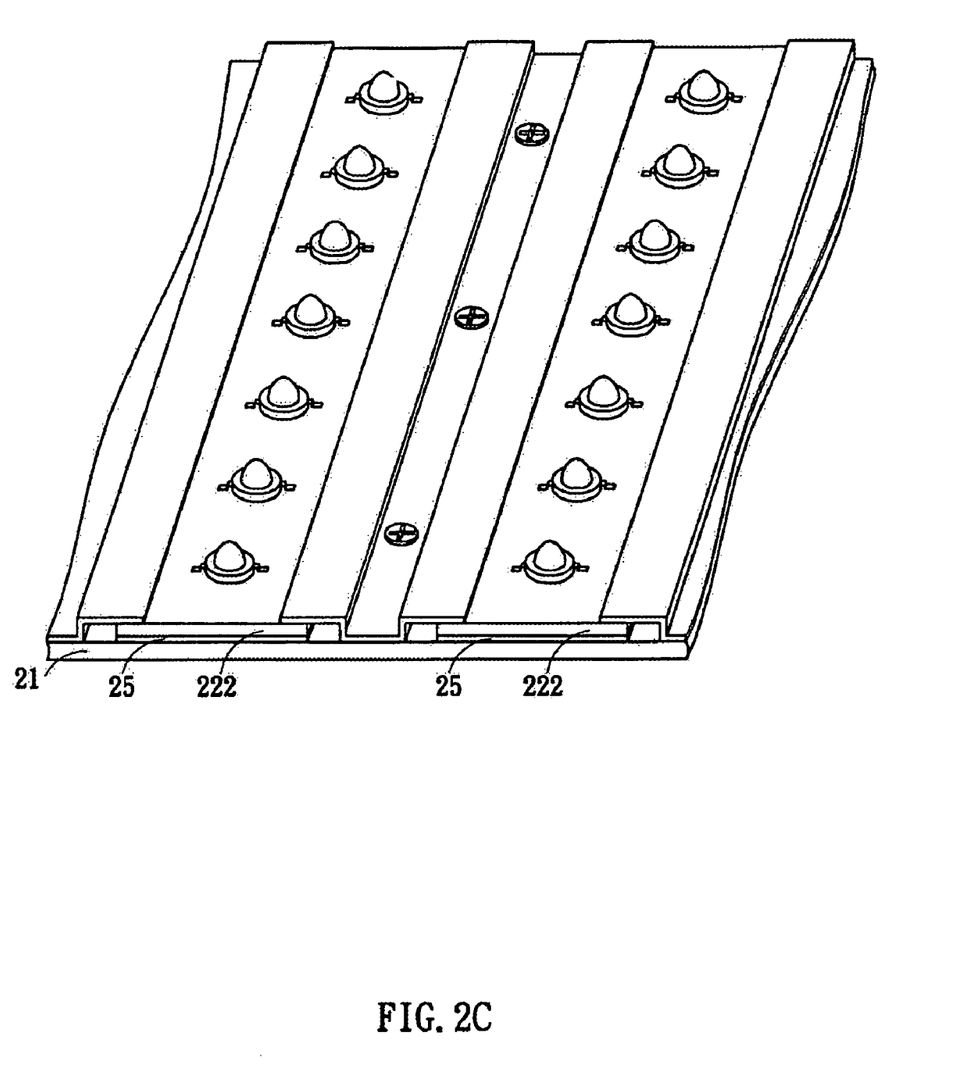
FIG. 2C is a perspective view illustrating a thermal conductive pad inserted between the metal board and the backboard according to another embodiment of the present invention.

In order to further reduce the voids between the metal board 222 and the backboard 21, based on other embodiments of the present invention as referring to FIG. 2C, it is configured a thermally conductive pad 25 between the metal board 222 and the backboard 21 to increase the contact area to enhance the efficiency of the thermal dissipation. And the thermal pad 25 can improve the tolerance between the metal board 222 and the backboard 21 during producing the materials.

Figure 2D:
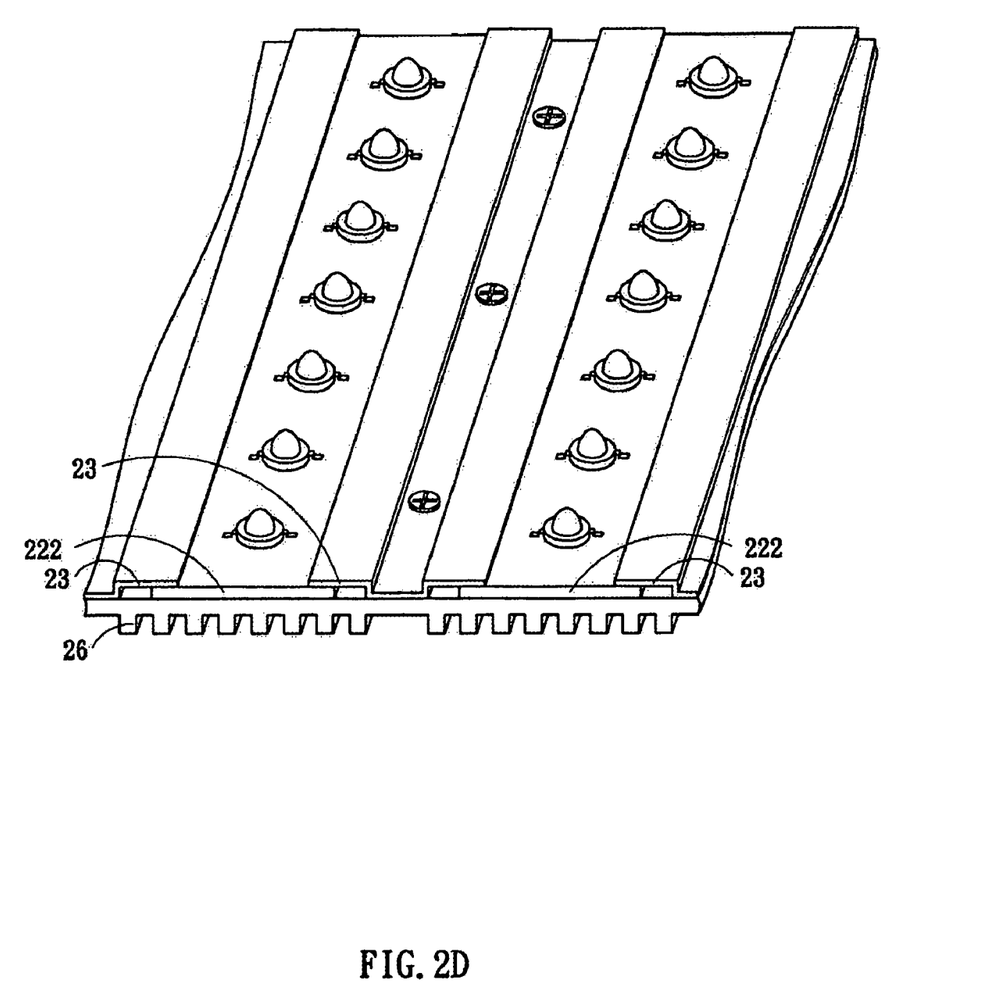
FIG. 2D is a perspective view illustrating a heat sink utilized in the backlight module according to a further embodiment of the present invention.

Instead of using the thermal pad 25, the efficiency of thermal dissipation of the backlight module 2 according to the embodiment of the present invention can also be improved by adding a heat sink 26 or replacing the backboard 21 by the heat sink 26 as shown in FIG. 2D.

Figure 2E:
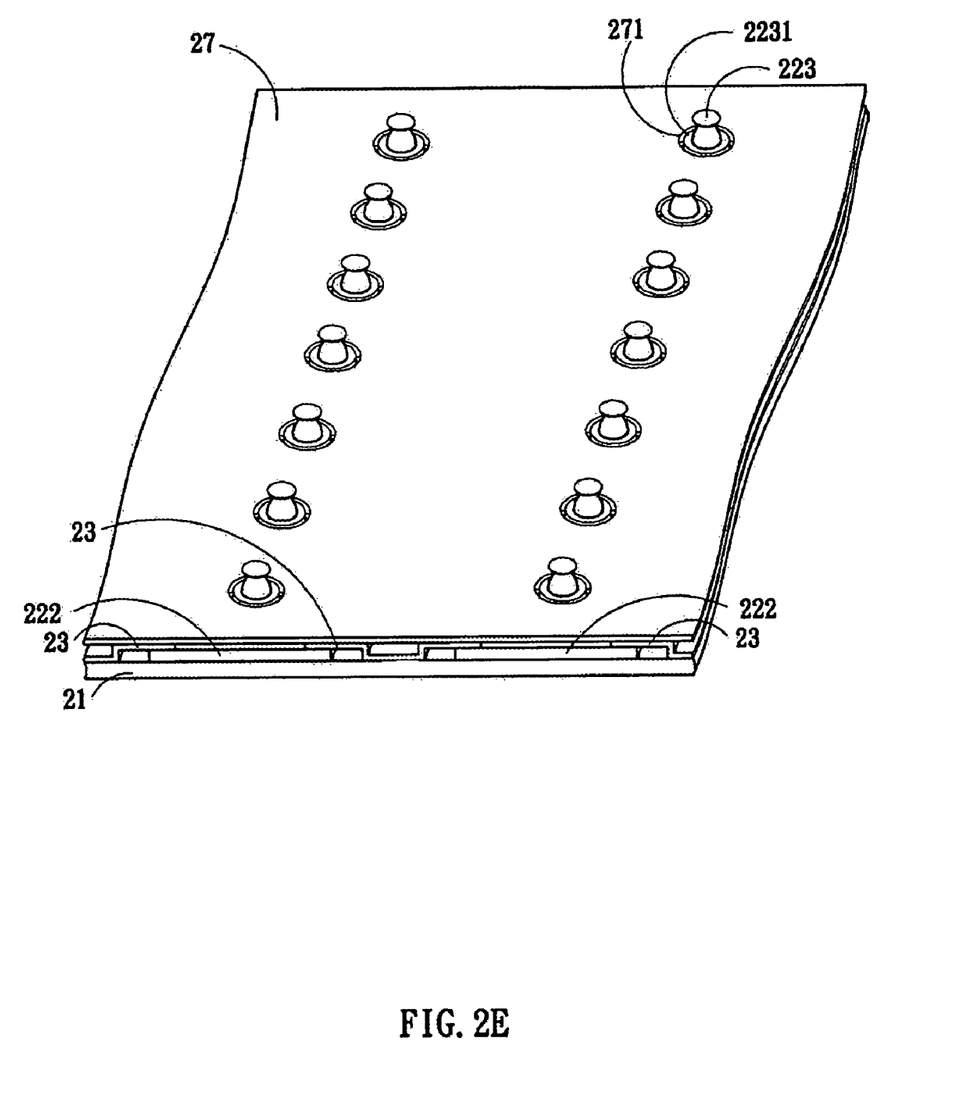
FIG. 2E is a perspective view illustrating a reflective board configured on the lighting unit and the rigid metal board according to a further embodiment of the present invention.

According to another embodiment of the present invention, as shown in FIG. 2E, in which side-emitting lighting elements 223 are used as the light source, a reflective board 27 is required within the lighting unit. The reflective board 27 has holes 271 with dimension larger than that of the side-emitting lighting elements 223, such that the side-emitting lighting elements 223 could protrude from the holes 271. The reflective board 27 covers the metal boards 222, which are fastened by the rigid metal board 23, and accordingly, the side-emitting lighting elements 223 generate uniform light out of the backlight module.

FIGS. 3A to 3E illustrate other embodiments of the present invention, and will be described with respect to the embodiments of FIGS. 2A to 2E, respectively. The composing elements in FIGS. 3A to 3E that are the same as corresponding ones in FIGS. 2A to 2E are labeled with the same reference numerals, and will be only briefly discussed or even passed over. The elements that are modified, however, are labeled with different reference numerals, and will be discussed as follows.

Figure 3A:
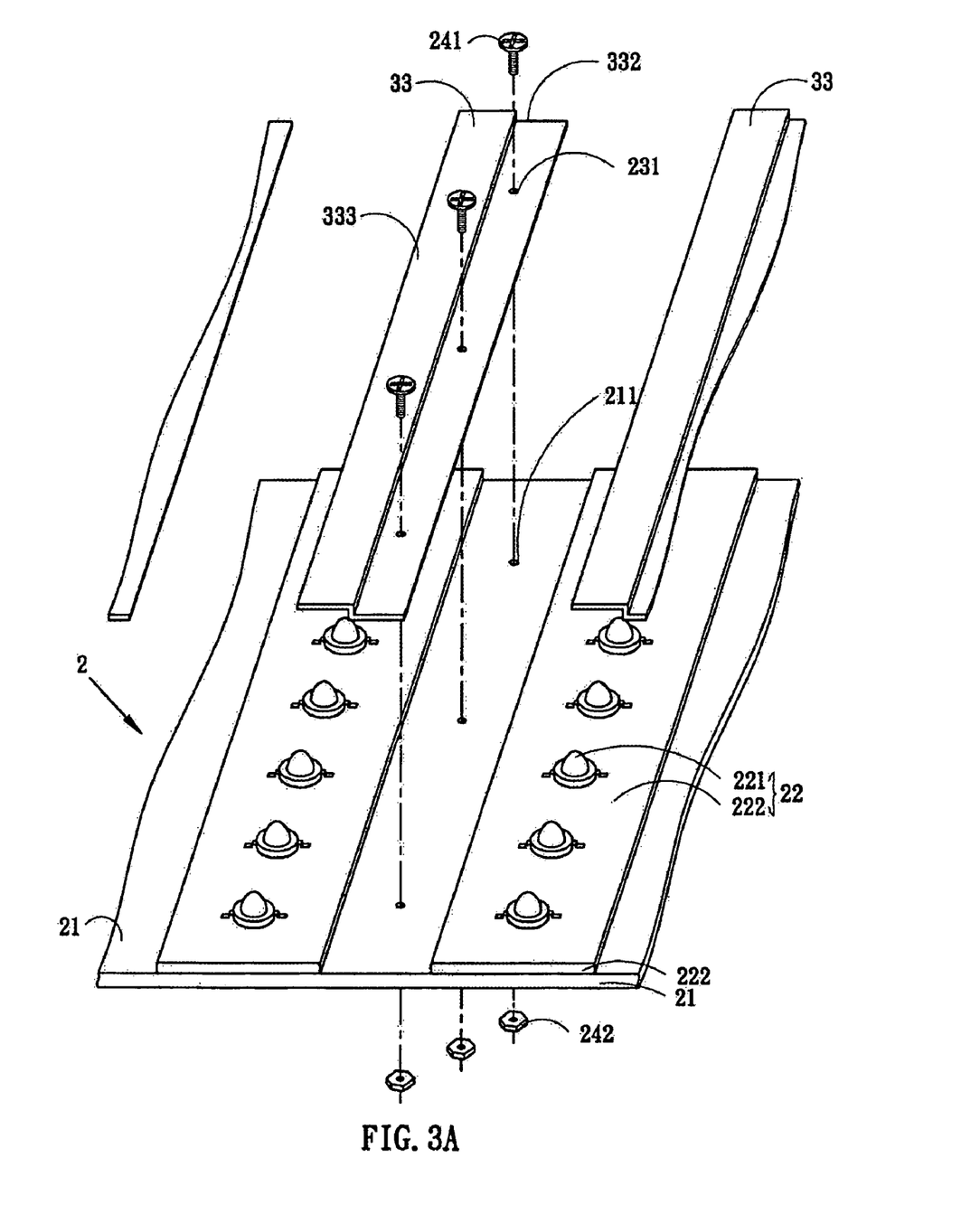
FIGS. 3A to 3E illustrate other embodiments of the present invention, which are similar to those of FIGS. 2A-2E except for a modified rigid metal board.
Figure 3B:
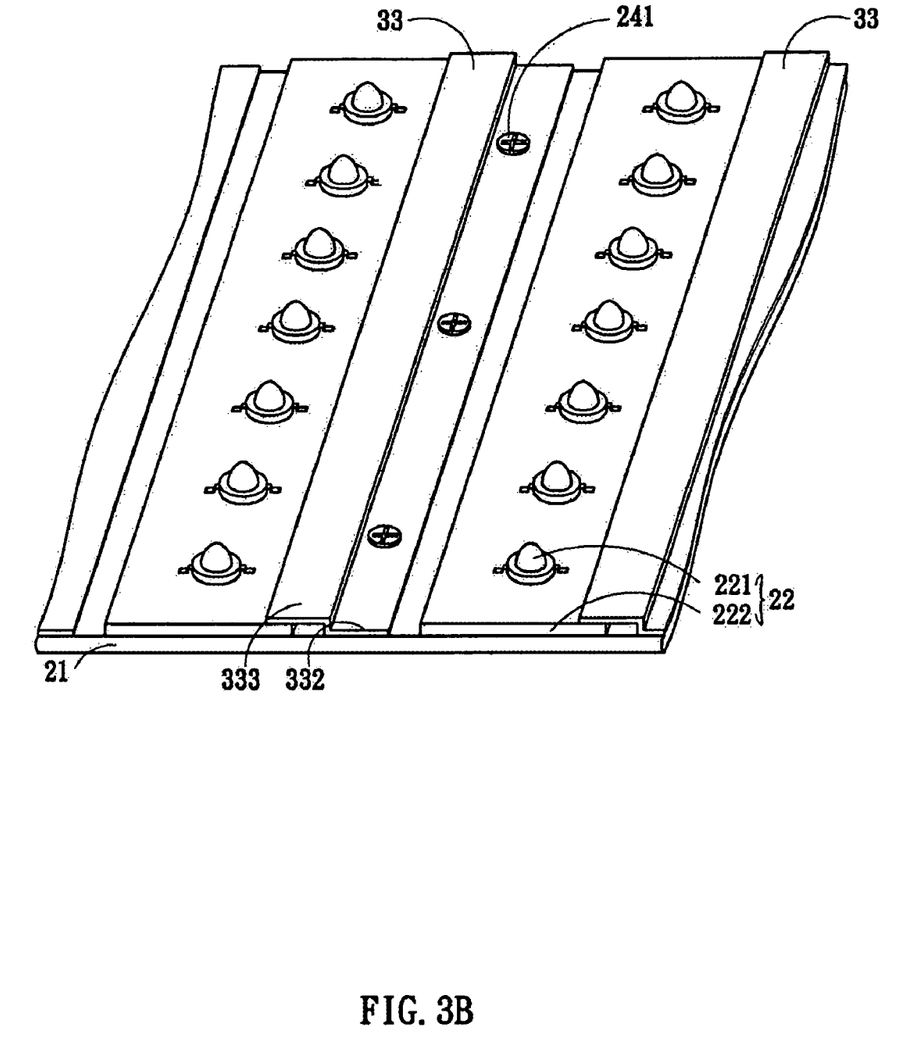

FIGS. 3A-3B illustrate a backlight module 2 similar to that of FIGS. 2A-2B except that the rigid metal board 33 mainly includes two portions arranged in a step configuration. Specifically, the first portion 332 is recognized as the bottom step, and the second portion 333 as the top step. In assembling, when the bolts 241 are passed through the holes 231 of the bottom portion 332 and the holes 211 of the backboard 21, and locked together with nuts 242, the rigid metal board 33 can be fastened on the backboard 21. And, the strength of the compressing provided by the rigid metal board 33, especially the top portion 333, can fasten the adjacent boards 222 on the backboard 21.

Figure 3C:
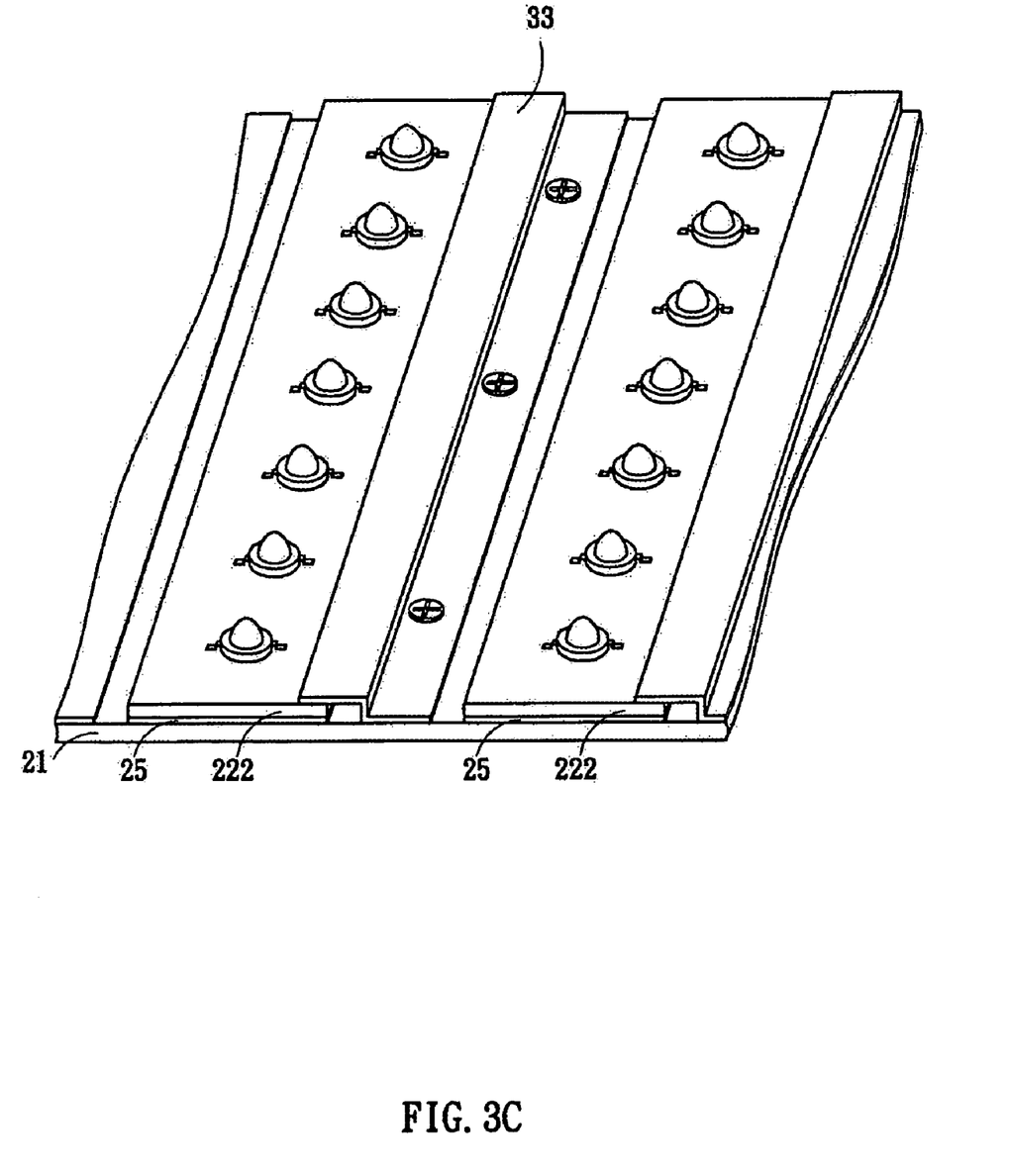

FIG. 3C illustrates a backlight module similar to that of FIG. 2C except that the rigid metal board 33 mainly includes two portions arranged in a step configuration as described in the previous paragraph. Referring to FIG. 3C, a thermally conductive pad 25 is configured between the metal board 222 and the backboard 21 to increase the contact area to enhance the efficiency of the thermal dissipation.

Figure 3D:
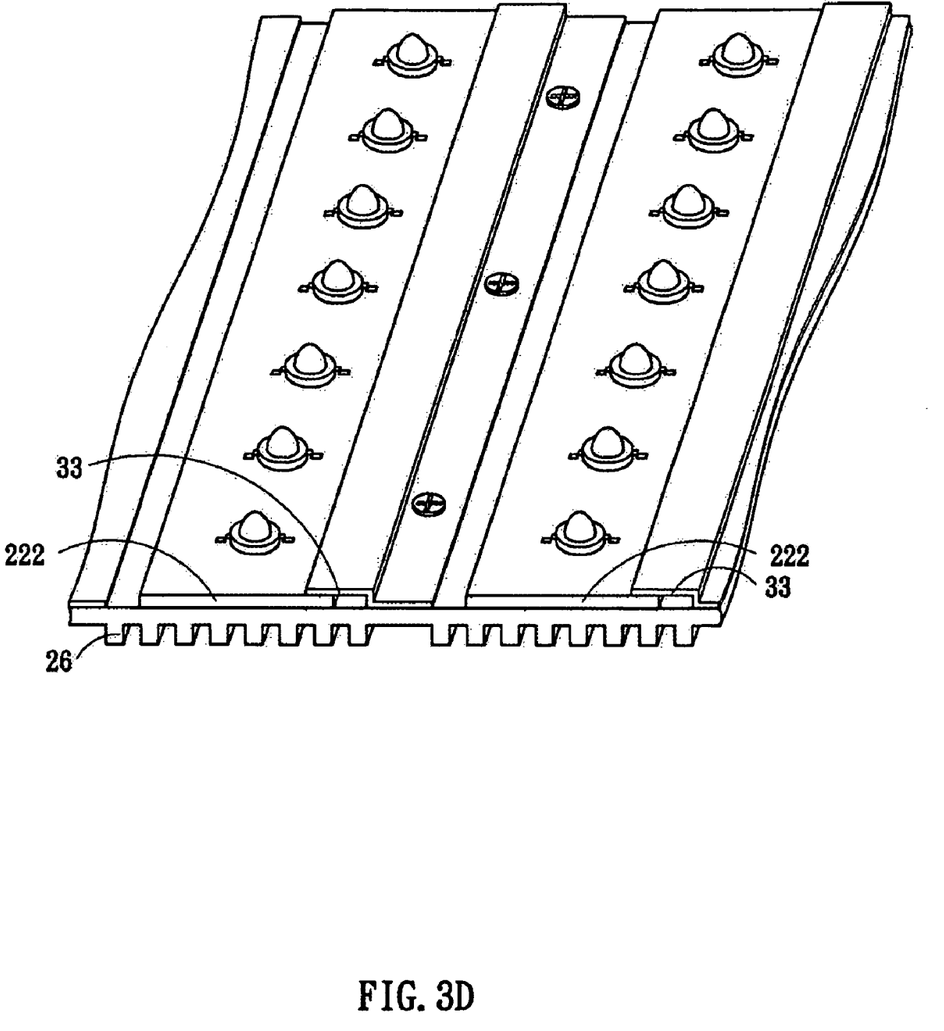

FIG. 3D illustrates a backlight module similar to that of FIG. 2D except that the rigid metal board 33 mainly includes two portions arranged in a step configuration as described in the previous paragraphs. The efficiency of thermal dissipation of the backlight module according to this embodiment can be improved by adding a heat sink 26 or replacing the backboard 21 by the heat sink 26.

Figure 3E:
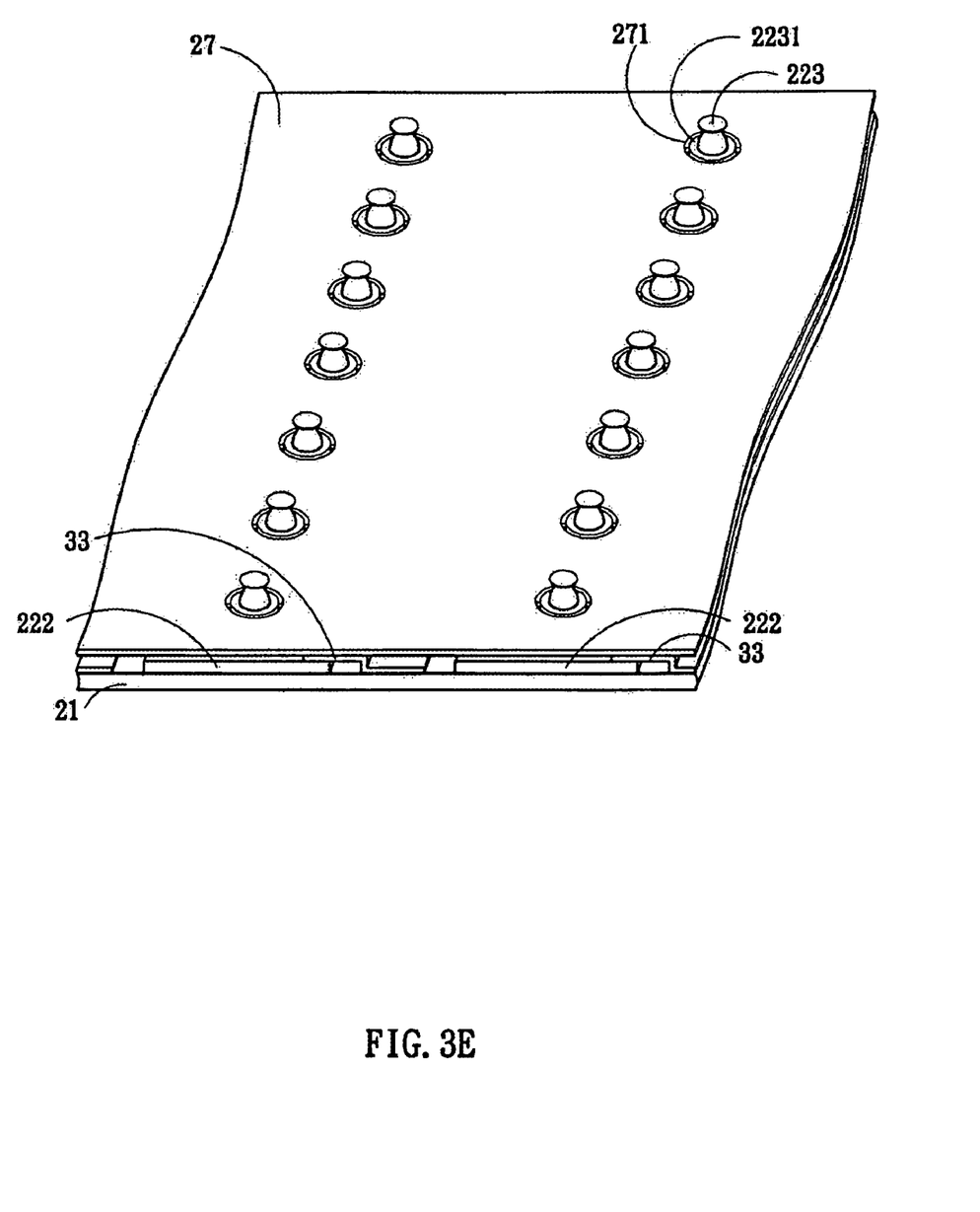

FIG. 3E illustrates a backlight module similar to that of FIG. 2E except that the rigid metal board 33 mainly includes two portions arranged in a step configuration as described in the previous paragraphs. In this embodiment, the reflective board 27 covers the metal boards 222, which are fastened by the rigid metal board 33, and accordingly, the side-emitting lighting elements 223 generate uniform light out of the backlight module.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A backlight module, comprising:
   a backboard;
   a plurality of lighting units disposed on the backboard; and
   at least one rigid board, disposed between two adjacent lighting units, having two sides lapping over the two adjacent lighting units, respectively.

2. The backlight module of claim 1, wherein each of said lighting units comprises a plurality of lighting elements, and a carrying board for carrying said plurality of lighting elements.

3. The backlight module of claim 2, wherein said rigid board partially laps over the carrying board.

4. The backlight module of claim 1, wherein said rigid board is a tinned steel board.

5. The backlight module of claim 1, wherein said rigid board is a stainless steel board.

6. The backlight module of claim 1, further comprising a fastener configured to fasten the rigid board on the backboard.

7. The backlight module of claim 6, wherein said rigid board comprises a concave portion with a bottom of the concave portion attached to the backboard.

8. The backlight module of claim 7, wherein said rigid board and said backboard have a first hole and a second hole, respectively, and wherein the first hole is positioned on the concave portion, and the second hole is positioned corresponding to the first hole.

9. The backlight module of claim 8, wherein said fastener comprises a screw, and the second hole is a threaded hole.

10. The backlight module of claim 8, wherein said fastener comprises a bolt and a nut, said bolt being passed through the first hole and the second hole and locked on the nut, thereby fastening the rigid board on the backboard.

11. The backlight module of claim 2, further comprising a thermal conductive pad located between the carrying board and the backboard.

12. The backlight module of claim 2, further comprising a reflective board covering the rigid board.

13. The backlight module of claim 12, wherein said reflective board has a hole such that the lighting element protrudes from the hole.

14. The backlight module of claim 1, wherein said backboard comprises a heat dissipating portion.

15. A backlight module, comprising:
   a backboard;
   a plurality of lighting units disposed on the backboard; and
   at least one rigid board, disposed adjacent the lighting unit, having at least one side lapping over a side portion of the lighting unit.

16. The backlight module of claim 15, wherein each of said lighting units comprises a plurality of lighting elements, and a carrying board for carrying said plurality of lighting elements.

17. The backlight module of claim 15, wherein said rigid board comprises a first portion and a second portion connected to the first portion, said first portion being attached to the backboard.

18. The backlight module of claim 16, further comprising a thermal conductive pad located between the carrying board and the backboard.

19. The backlight module of claim 16, further comprising a reflective board covering the rigid board, wherein said reflective board has a hole such that the lighting element protrudes from the hole.

20. The backlight module of claim 15, wherein said backboard comprises a heat dissipating portion.

* * * * *